United States Patent [19]

Driskel

[11] Patent Number: 4,676,591

[45] Date of Patent: Jun. 30, 1987

[54] OPTICAL FIBRE RIBBON STRUCTURE

[75] Inventor: Stephen P. Driskel, Astley, England

[73] Assignee: BICC Public Limited Company, London, England

[21] Appl. No.: 745,902

[22] Filed: Jun. 18, 1985

[30] Foreign Application Priority Data

Jun. 22, 1984 [GB] United Kingdom ................ 8416000

[51] Int. Cl.$^4$ ................................................ G02B 6/44
[52] U.S. Cl. ............................... 350/96.23; 350/96.10
[58] Field of Search ........................................ 350/96.23

[56] References Cited

FOREIGN PATENT DOCUMENTS

| 0011230 | 1/1980 | Japan | 350/96.23 |
| 1425928 | 2/1976 | United Kingdom | 350/96.23 |

Primary Examiner—William L. Sikes
Assistant Examiner—Akm E. Ullah
Attorney, Agent, or Firm—Buell, Ziesenheim, Beck & Alstadt

[57] ABSTRACT

An optical fibre ribbon structure suitable for loosely housing in a bore of an optical cable comprises an optical fibre ribbon which comprises a plurality of optical fibres arranged side by side and embedded in a plastics body and which extends lengthwise on and is secured to one surface of a plastics tape and two plastics insulated conductors, one of which insulated conductors extends lengthwise on and is secured to the surface of the tape on one side of the optical fibre ribbon and one of which insulated conductors extends lengthwise on and is secured to the surface of the tape on the other side of the optical fibre ribbon. Each insulated conductor has an overall diameter substantially greater than the overall thickness of the optical fibre ribbon. Each conductor may be of a resilient metal and each plastics insulated resilient conductor may be resiliently set in such a form that the ribbon structure follows a path of smoothly curved undulations whose axes of curvature lie transverse to the longitudinal axis of the ribbon structure.

10 Claims, 1 Drawing Figure

U.S. Patent   Jun. 30, 1987   4,676,591
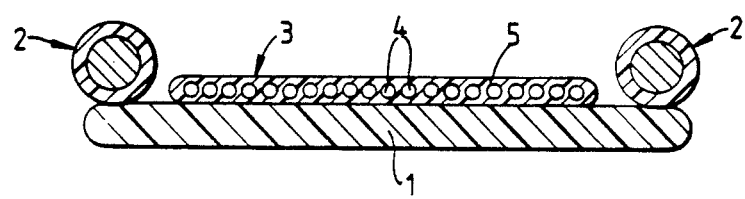

OPTICAL FIBRE RIBBON STRUCTURE

This invention relates to optical fibre ribbon structures for the transmission of the ultra-violet, visible and infra-red regions of the electromagnetic spectrum, which regions, for convenience, will hereinafter all be included in the generic term "light" and especially, but not exclusively, to optical fibre ribbon structures for use in the communications field adapted for transmission of light having a wave length within the range 0.8 to 1.9 micrometers.

The invention is particularly concerned with an optical fibre ribbon structure of the kind comprising a plurality of optical fibres arranged side by side and secured to one surface of a tape of plastics material.

It is an object of the present invention to provide an improved optical fibre ribbon structure of the aforesaid kind which, in its preferred form, is especially, but not exclusively, suitable for use in an optical cable or other application where there is a risk that optical fibres will be subjected to a tensile force.

According to the invention, the improved optical fibre ribbon structure comprises a plurality of optical fibres arranged side by side and extending lengthwise on and secured to one surface of a tape of plastics material and at least two plastics insulated conductors, at least one of which insulated conductors extends lengthwise on and is secured to said surface of the tape on one side of the plurality of optical fibres and at least one of which insulated conductors extends lengthwise on and is secured to said surface of the tape on the other side of the plurality of optical fibres, each insulated conductor having an overall diameter substantially greater than the overall diameter of each of the optical fibres.

Preferably, the plurality of optical fibres are arranges side by side and embedded in an elongate body of plastics material to form an optical fibre ribbon, which ribbon is secured to said surface of the plastics tape; preferably, also, each insulated conductor has an overall diameter substantially greater than the overall thickness of the optical fibre ribbon.

The optical fibre ribbon and the plastics insulated conductors are preferably secured to said surface of the plastics tape by fusion bonding or by an intermediate layer of resin or other adhesive.

Where the improved optical fibre ribbon structure is to be used in an optical cable or other application where there is a risk that optical fibres will be subjected to a substantial tensile force, preferably each conductor is of a resilient metal or metal alloy and each plastics insulated resilient conductor is set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure will tend to straighten in a lengthwise direction against the action of the undulating resilient conductors thereby reducing the tensile force applied to the optical fibres and, when the tensile force is removed, the ribbon structure will return towards its original undulating form.

Preferably, the axes of curvature of the undulations lie parallel to one another and substantially normal to the longitudinal axis of the optical fibre ribbon structure.

For optical fibres having an overall diameter of 250 micrometers, preferably the radius of curvature of each undulation of the undulating optical fibre ribbon structure is not less than 40 mm.

The smoothly curved undulations in the improved optical fibre ribbon structure are preferably formed by causing the improved optical fibre ribbon structure to travel in the direction of its length and to be partially wrapped around each of a plurality of transversely extending, longitudinally spaced formers of substantially circular or partially circular cross-section travelling in the same direction as the advancing ribbon structure and preferably at such a speed that there is substantially no relative movement between the advancing formers and the ribbon structure travelling therebetween, the direction of wrap around one former being in the opposite circumferential direction to the direction of wrap around the or each adjacent former and the circumferential extent of wrap around each of the formers being such that each insulated resilient conductor is set in such a form that the optical fibre ribbon structure follows a path of smoothly curved undulations whose axes of curvature lie transverse to the longitudinal axis of the ribbon structure.

Preferably, the transversely extending longitudinally spaced formers are carried on a pair of advancing endless belts, the formers on one belt inter-engaging between the formers on the other belt.

Each of the formers may have a radius of curvature substantially less than the desired radius of curvature of each undulation of the undulating optical fibre ribbon structure but since, during manufacture of the undulating optical fibre ribbon structure, the ribbon structure is caused to follow a path of smoothly curved undulations whose radii of curvature are substantially less than the desired minimum value for only a very brief period, no permanent damage is caused to the optical fibres which would affect their light transmission efficiency or their long term strength.

Preferably, the set in the insulated resilient conductors is mechanically formed by causing the advancing optical fibre ribbon structure to be partially wrapped around each of a plurality of formers of such diameter and so spaced apart and staggered with respect to the rectilinear axis of the advancing ribbon structure that the insulated resilient conductors are deformed beyond their elastic limit.

The invention also includes an optical cable having an outer sheath of plastics material and having, extending throughout its length, at least one bore in which is loosely housed at least one improved optical fibre ribbon structure as hereinbefore described.

The sheath may bound a single bore extending along the length of the optical cable or it may surround two or more separately formed tubes of plastics material, the bore of at least one of said tubes having loosely housed therein at least one improved optical fibre ribbon structure as hereinbefore described.

In all cases, the or each bore loosely housing an undulating optical fibre ribbon structure may be substantially filled throughout its length with a greasy water-impermeable medium, such as a water-impermeable medium consisting of, or comprising as a major constituent, petroleum jelly, or with a silicone gel.

The invention is further illustrated by a description, by way of example, of a preferred optical fibre ribbon structure with reference to the accompanying drawing which shows, on an enlarged scale, a transverse cross-sectional view of the optical fibre ribbon structure.

Referring to the drawing, the preferred optical fibre ribbon structure comprises a tape 1 of plastics material which has a width of 6 mm and a thickness of 500 micrometers, two plastics insulated copper conductors 2 which extend lengthwise along and are secured by fusion bonding to marginal portions of one surface of the tape and, fusion bonded to said surface of the tape between the insulated conductors, an optical fibre ribbon 3 comprising a plurality of optical fibres 4 arranged side by side and embedded in an elongate body 5 of plastics material. Each plastics insulated conductor 2 has an overall diameter of 1 mm and the optical fibre ribbon 3 has an overall thickness of 0.4 mm. Each plastics insulated copper conductor 2 is set in such a form that the optical fibre ribbon structure follows a path of smoothly curved undulations whose axes of curvature lie transverse to the longitudinal axis of the ribbon structure. When the undulating optical fibre ribbon structure is subjected to a tensile force, the ribbon structure will tend to straighten in a lengthwise direction against the action of the undulating copper conductors 2 thereby reducing the tensile force applied to the optical fibres 4 and, when the tensile force is removed, the optical fibre ribbon structure will return towards its original undulating form.

What I claim as my invention is:

1. In an optical fibre ribbon structure comprising a tape of plastics material and a plurality of optical fibres arranged side by side and extending lengthwise on and secured to one surface of the tape, the improvement comprising the incorporation of at least two plastics insulated conductors, at least one of which insulated conductors extends lengthwise on and is secured to said surface of the tape on one side of the plurality of optical fibres and at least one of which insulated conductors extends lengthwise on and is secured to said surface of the tape on the other side of the plurality of optical fibres, each insulated conductor having an overall diameter substantially greater than the overall diameter of each of the optical fibres.

2. In an optical fibre ribbon structure comprising a tape of plastics material and a plurality of optical fibres arranged side by side and extending lengthwise on and secured to one surface of the tape, the improvement wherein said plurality of optical fibres is embedded in an elongate body of plastics material to form an optical fibre ribbon, which optical fibre ribbon extends lengthwise on and is secured to said one surface of the tape and wherein at least two plastics insulated conductors are incorporated in the optical fibre ribbon structure, at least one of which insulated conductors extends lengthwise on and is secured to said surface of the tape on one side of the optical fibre ribbon and at least one of which insulated conductors extends lengthwise on and is secured to said surface of the tape on the other side of the optical fibre ribbon, each insulated conductor having an overall diameter substantially greater than the overall diameter of each of the optical fibres.

3. An optical fibre ribbon structure as claimed in claim 2, wherein each insulated conductor has an overall diameter substantially greater than the overall thickness of the optical fibre ribbon.

4. An optical fibre ribbon structure as claimed in claim 2 or 3, wherein the optical fibre ribbon and the plastics insulated conductors are secured to said surface of the plastics tape by fusion bonding.

5. An optical fibre ribbon structure as claimed in claim 2 or 3, wherein the optical fibre ribbon and the plastics insulated conductors are secured to said surface of the plastics tape by an intermediate layer of adhesive.

6. An optical fibre ribbon structure as claimed in claim 1, wherein each conductor is of a resilient metal or metal alloy and each plastics insulated resilient conductor is set in such a form that the ribbon structure follows a path of smoothly curved undulations whose axes of curvature lie transverse to the longitudinal axis of the ribbon structure, the arrangement being such that, when the undulating ribbon structure is subjected to a tensile force, the ribbon structure will tend to straighten in a lengthwise direction against the action of the undulating resilient conductors thereby reducing the tensile force applied to the optical fibres and, when the tensile force is removed, the ribbon structure will return towards its original undulating form.

7. An optical fibre ribbon structure as claimed in claim 6, wherein the axes of curvature of the undulations lie parallel to one another and substantially normal to the longitudinal axis of the optical fibre ribbon structure.

8. An optical fibre ribbon structure as claimed in claim 6 or 7, wherein each optical fibre has an overall diameter of 250 micrometers and the radius of curvature of each undulation of the undulating optical fibre ribbon structure is not less than 40 mm.

9. An optical cable having an outer sheath of plastics material and having, extending throughout its length, at least one bore in which is loosely housed at least one optical fibre ribbon structure as claimed in claim 1 or 2.

10. An optical cable having an outer sheath of plastics material surrounding at least two separately formed tubes of plastics material, the bore of at least one of said tubes having loosely housed therein at least one optical fibre ribbon structure as claimed in claim 1 or 2.

* * * * *